United States Patent
Kazmi

(10) Patent No.: US 8,223,670 B2
(45) Date of Patent: Jul. 17, 2012

(54) METHOD AND APPARATUS FOR REDUCING THE SIGNALLING BANDWIDTH LOAD BY REPORTING MEASUREMENTS IN DIFFERENTIAL MANNER IN A MULTICAST MESSAGE

(75) Inventor: Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 480 days.

(21) Appl. No.: 12/513,991

(22) PCT Filed: Nov. 30, 2006

(86) PCT No.: PCT/SE2006/050524
§ 371 (c)(1),
(2), (4) Date: Jun. 4, 2009

(87) PCT Pub. No.: WO2008/066432
PCT Pub. Date: Jun. 5, 2008

(65) Prior Publication Data
US 2010/0039950 A1 Feb. 18, 2010

(51) Int. Cl.
*H04L 12/28* (2006.01)
*H04B 7/00* (2006.01)
*H04W 4/00* (2009.01)

(52) U.S. Cl. .................. 370/254; 370/310; 370/328

(58) Field of Classification Search .................. None
See application file for complete search history.

(56) References Cited

U.S. PATENT DOCUMENTS

| | | | |
|---|---|---|---|
| 2001/0008542 A1* | 7/2001 | Wiebke et al. | 375/141 |
| 2002/0110088 A1 | 8/2002 | Lundby et al. | |
| 2003/0147386 A1 | 8/2003 | Zhang et al. | |
| 2005/0170782 A1* | 8/2005 | Rong et al. | 455/67.11 |
| 2005/0192003 A1* | 9/2005 | Tamukai | 455/424 |
| 2005/0250495 A1 | 11/2005 | Black et al. | |
| 2006/0099982 A1* | 5/2006 | Nisbet | 455/518 |

FOREIGN PATENT DOCUMENTS

| | | |
|---|---|---|
| WO | 2005060190 A1 | 6/2005 |
| WO | 2007046734 A1 | 4/2007 |

OTHER PUBLICATIONS

PCT International Search Report, mailed Aug. 17, 2007, in connection with International Application No. PCT/SE2006/050524.
3GPP Technical Report TR 25.814, Version 7.1.0 "Physical Layer Aspects for Evolved UTRA" Release 7, Sep. 2006.

* cited by examiner

*Primary Examiner* — Xavier Szewai Wong
(74) *Attorney, Agent, or Firm* — Potomac Patent Group PLLC

(57) ABSTRACT

A signalling method for reducing the bandwidth needed for communicating measurement values from at least a first source base station (11, 12, 13, 14) to at least a 5 first target base station (21, 22, 23, 24, 25) connected through a core base station (10) comprising the steps of—reporting at least a first measurement value from the at least first source base station (11, 12, 13, 14) to the core base station (10), —preferably sorting the measurement values in descending order, 10—including, in the core base station (10) value information about the at least first measurement value in a multicast message, —transmitting the multicast message to the at least first target base station (21, 22, 23, 24, 25), characterized in that the value information is determined as a first difference between a maximum value and the first measurement value.

17 Claims, 5 Drawing Sheets

| 61 | | | | 62 | | | | 63 | | | | 64 | | | |
|---|---|---|---|---|---|---|---|---|---|---|---|---|---|---|---|
| Source | | | | Target | | | | Type | | | | Differential values | | | |
| 14 | 11 | 12 | 13 | 21 | 25 | 24 | 21 | $X_1$ | $X_2$ | $X_3$ | $X_4$ | 10 | 5 | 15 | 20 |

| 71 | | | | 72 | | | | 73 | | | | 74 | | | |
|---|---|---|---|---|---|---|---|---|---|---|---|---|---|---|---|
| Source | | | | Target | | | | Type | | | | Differential values | | | |
| $S_1$ | $S_2$ | $S_3$ | $S_4$ | $T_1$ | $T_2$ | $T_3$ | $T_4$ | $X_1$ | $X_2$ | $X_3$ | $X_4$ | $M_{max}-M_1$ | $M_1-M_2$ | $M_2-M_3$ | $M_3-M_4$ |

METHOD AND APPARATUS FOR REDUCING THE SIGNALLING BANDWIDTH LOAD BY REPORTING MEASUREMENTS IN DIFFERENTIAL MANNER IN A MULTICAST MESSAGE

TECHNICAL FIELD

The present invention relates in general to communication in a cellular network and more specifically to the reporting of measurements in such a network.

BACKGROUND AND RELATED ART

In an OFDMA/SC-FDMA based system the available bandwidth is sub-divided into several resource blocks or units as defined, for example in 3GPP TR 25.814: "Physical Layer Aspects for Evolved UTRA". According to this document a resource block is defined in both time and frequency. In the downlink each user terminal estimates the downlink channel quality on each resource block and reports the measured quality to the network. The downlink channel quality can be indicated by various types of measurements carried out by the terminal, such as channel quality indicator (CQI), received signal strength indicator (RSSI), transmit power of the terminal, signal to interference and noise ratio (SINR) etc.

In the uplink on the other hand, the base station, often referred to as Node B, can carry out various types of measurements such as downlink total transmit carrier power, downlink transmit carrier power per resource block, uplink received total wide band power, resource block usage etc. Based on the measurements reported by the terminal and the measurements performed by the base station, the network can dynamically allocate or schedule the resource blocks to the users for data transmission. The network also utilizes these measurements to perform other types of radio resource management tasks such as handover, congestion control, admission control etc.

In CDMA systems each user is allocated the entire bandwidth but different users are distinguished by assigning a separate orthogonal and/or scrambling code. However in OFDMA/SC-FDMA systems, each cell possesses several resource blocks depending upon the system bandwidth. This is because the bandwidth of a resource block is much smaller than that of the system bandwidth. In an E-UTRA, according to the current working assumption, the resource block comprises of 180 kHz in frequency and 0.5 ms in time. As an example there will be 48 and 96 resource blocks for 10 MHz and 20 MHz respectively since some portion of the bandwidth acts as guard band and is therefore left unused. Some radio resource management functions such as scheduling, inter-cell interference coordination, congestion control etc would require the terminal and the base station to carry out various kinds of measurements on each or on a group of resource blocks. Furthermore, in order to track fast temporal channel variations the measurements are to be reported quite frequently, such as every transmission time interval (TTI), which is 1 ms. This would involve considerable signalling overheads leading to capacity loss.

In E-UTRA, different types of measurements from a base station may be reported to several neighbouring base stations. This would lead to duplication of measurement reports over mesh type network such as in E-UTRA, where all the base stations are logically connected to each other. This would imply considerable signalling overheads over the interfaces between the base stations. It has therefore been proposed to multicast measurements to a group or a set of base stations that has joined the distribution list. This implies that measurements from different base stations shall be multicast to several set of base stations.

International Patent Application No PCT/SE2005/001579 discloses a method for reducing the signalling load especially on the radio interface in E-UTRA by reporting measurements in differential manner, that is, reporting each measurement value as a difference between the measurement value and a maximum value defined for the relevant type of measurement. This differential method is also described in 3GPP TR 25.814: "Physical Layer Aspects for Evolved UTRA".

The state of the art solution reduces the signalling overheads for each measurement individually. However in the current system a terminal may have to report several different kinds of measurements. Similarly each base station may report several types to measurements to its neighbouring base stations. This means there will still be considerable overhead due to measurement reporting.

OBJECT OF THE INVENTION

It is an object of the invention to reduce the signalling load in a wireless communication network, and in particular the signalling load between base stations.

SUMMARY OF THE INVENTION

This object is achieved according to the present invention by a base station for use as a core base station in a tree structure comprising at least a first and a second branch of base stations, said base station comprising receiving means for receiving from at least a first source base station information about at least a first measurement value intended for at least a first target base station, generating means for generating a multicast message including information about the at least first measurement value, and transmitting means for transmitting the multicast message, said base station being characterized in that the generating means comprises calculating means for calculating a differential value based on the at least first measurement value and at least a maximum value for the at least first measurement value.

This object is also achieved by a base station arranged to communicate in a cellular network with at least one other base station, through a core base station, said base station comprising receiving means for receiving from the core base station a multicast message related to at least one measurement value from a source base station, and retrieving means for retrieving at least one measurement value intended for it, said base station being characterized in that the retrieving means comprises extracting means arranged to extract a value information which is a differential value based on the measurement value and at least a maximum value for the measurement value and a calculating means arranged to calculate the measurement value based on at least the differential value and the maximum value.

Hence, according to the invention a base station that can act as a core base station and a base station that can act as a target base station, respectively, are achieved. According to the invention, one or more of the source base stations will present their measurement values to the core base station, which will calculate differential measurement values which requires less bandwidth than the actual values. The differential measurement values are then included in a multicast message and transmitted to the target base station. The target base station, in turn is able to interpret the multicast message, extract the information intended for it and calculate the actual measurement value on the basis of the differential value.

The object is also achieved by a signalling method for communicating measurement values from at least a first source base station to at least a first target base station connected through a core base station comprising the steps of reporting at least a first measurement value from the at least first source base station to the core base station, including, in the core base station value information about the at least first measurement value in a multicast message and transmitting the multicast message to the at least first target base station, said method being characterized in that the value information is determined as a first difference between a maximum value and the first measurement value.

This method is chiefly performed in the core base station, for creating the differential measurement values and multicast messages as discussed above.

The object is also achieved by a signalling method for retrieving measurement values from at least a first source base station in at least a first target base station, said source and target base stations being connected through a core base station comprising the steps of receiving in a first target base station a multicast message from the core base station;

determining, on the basis of the multicast message, at least a first measurement value intended for the first target base station;

said method being characterized in that the step of determining the measurement value comprises the steps of extracting value information related to the measurement value from the multicast message and calculating the measurement value based on the value information an at least a maximum value for the measurement value.

This method is performed in the target base station for retrieving the actual measurement value intended for it.

The differential measurement reporting according to the invention enables more efficient use of existing IP multicasting in the transport network. According to the invention the signalling overhead is reduced and unnecessary measurement reports are prevented.

It should be noted that the source and target base stations do not have to be physically connected through the core base station as long as there is a logical connection through the core base station.

In the core base station, the calculating means is preferably arranged to determine value information related to a second measurement value as a second difference between the first difference and the second measurement value and to include this value information in the multicast message. The corresponding method preferably comprises the additional steps of determining value information related to a second measurement value as a second difference between the first difference and the second measurement value and including this value information in the multicast message.

In a particularly advantageous embodiment the core base station further comprises ordering means arranged to select the highest measurement value of a number of reported measurement values as the first measurement value and then handling the measurement values in descending order. The corresponding method also comprises the step of selecting the highest measurement value as the first measurement value and then handling the measurement values in descending order. This will minimize the size of the differential values, thereby minimizing the bandwidth required to transmit them.

The generating means is preferably arranged to include in the multicast message, for each measurement value, information about the source base station, the target base station and the type of measurement. In this way each target base station will be able to tell which values are intended for it and how the actual measurement value can be retrieved.

The method performed in the core base station may be used for different types of communication that are particularly advantageous:

For communicating several measurement values, each belonging to a different measurement type from one source base station to one target base station.

For communicating several measurements related to several different source base stations to one or more target base stations.

For communicating several measurements, each belonging to a different measurement type related to one source base station to several target base stations.

The target base station preferably further comprises determining means for determining whether the multicast message comprises value information intended for at least one other target base station and comprising forwarding means for forwarding the multicast message to at least one further base station if this is the case. The corresponding method comprises the steps of determining whether the multicast message comprises value information intended for at least one other target base station and, if so, forwarding the multicast message to the at least one other target base station.

The target base station also preferably comprises calculating means arranged to prune the multicast message before forwarding it to the at least one other target base station. In this way the multicast message will only contain information needed by subsequent base stations, thereby further reducing the bandwidth required.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
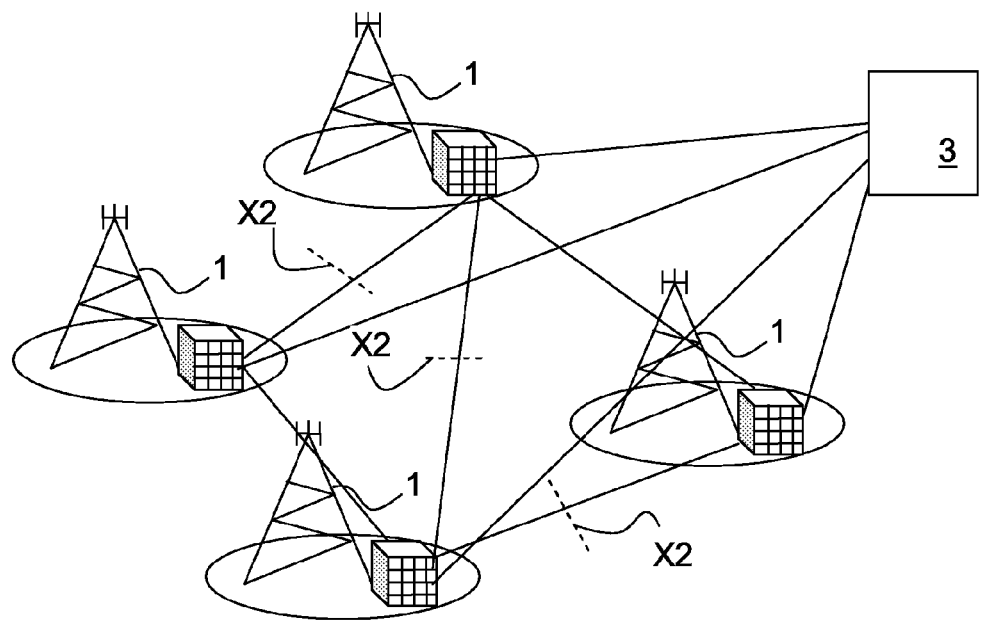
FIG. 1 shows a cellular network.

FIG. 1 shows a cellular network in which a number of base stations 1 are interconnected. All the base stations are served by the same access gateway 3. It should be noted that FIG. 1 is a logical diagram in the sense that the direct connections between any two base stations shown in the Figure may be implemented in reality through one or more other base stations.

In the current E-UTRA architecture each base station 1 is connected to all other base stations under the same access gateway (AGW) 3 forming a logical mesh network as shown in FIG. 1. As shown in FIG. 1 each base station can report its measurement to the neighbour base stations via an X2 interface or the so called Node B-Node B interface. Although this interface is only shown between some of the base stations it should be understood that it is present between all base stations connected to the same access gateway. Each base station 1 shall be able to report certain type of measurements to at least its closest neighbour base stations. The purpose of these measurements is to indicate the load or occupancy of radio resources at the base station. Some measurements may also depict the usage of transport network resources on the interfaces between the base stations and between the base stations and the access gateway. This allows the base station to carry out multicell radio resource management, i.e. a base station takes into account the load situation at the neighbouring base stations when allocating resources, doing handover, admitting new user etc. Obviously in such a distributed architecture there would be considerable signalling overheads on X2 interfaces.

Figure 2:
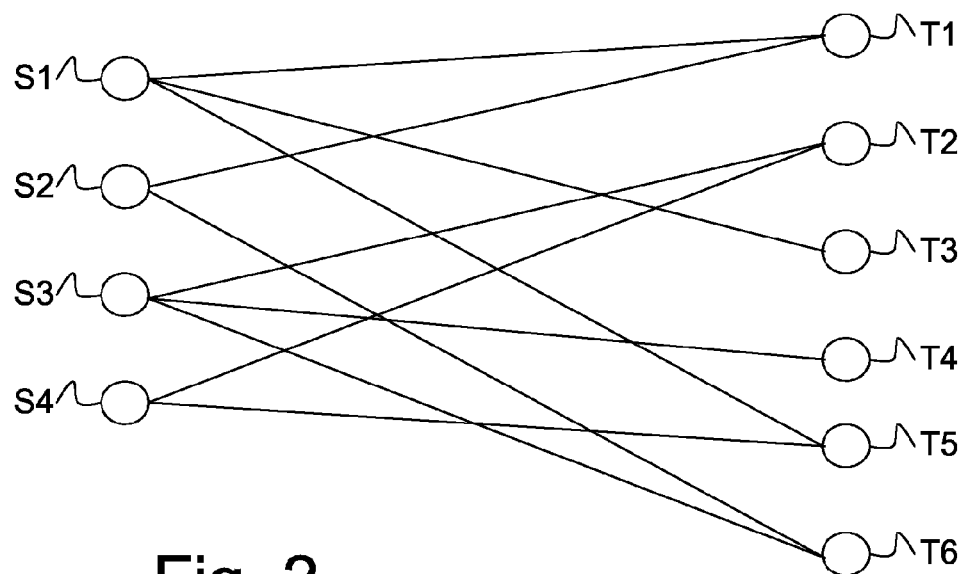
FIG. 2 illustrates transmission of measurement reports between base stations in a cellular network.

FIG. 2 illustrates the inventive multi-cellular differential reporting, which is realized in IP based multicasting or broadcasting networks. The E-UTRA transport network shall be based on IP technology. A number of source base stations S1, S2, S3, S4, that is, base stations which, in this example are reporting measurements, each transmit to one or more of a number of target base stations T1, T2, T3, T4, T5, T6. In the example shown in FIG. 2, for example, source base station S1 transmits to target base stations T1, T3 and T5. Source base station S2 transmits to target base stations T1 and T6.

According to a preferred embodiment of the invention each multicast source reports the difference between different base station measurements of the same type that are destined to base stations belonging to the same tree branch or multicast route, as will be discussed in more detail below.

Figures 3, 6, 7:
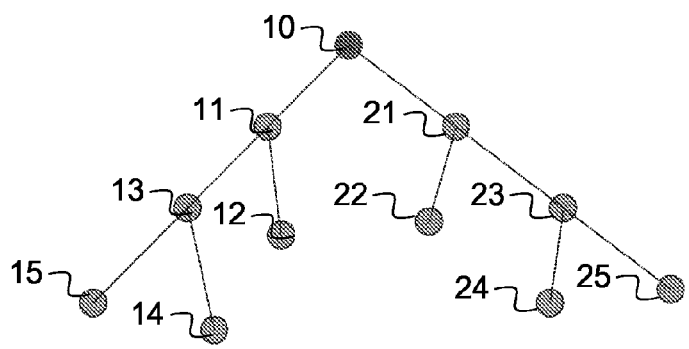
FIG. 3 shows a connection scheme for a number of base stations.
FIGS. 6 and 7 are examples of multicast messages according to the invention.

FIG. 3 shows a connection scheme for a number of base stations arranged in what is known as a core-base tree, in which a first base station 10 is connected to a first and a second branch of base stations. The first branch comprises base stations 11, 12, 13, 14, 15, where 11 is branched to 12 and 13, and 13 is branched to 14 and 15.

The second branch comprises base stations 21, 22, 23, 24, 25, where 21 is branched to 22 and 23 and 23 is branched to 24 and 25. Of course this is intended as an example only. The base stations may be physically interconnected in any possible way. The base stations include router functionality.

The first base station, or core base station, 10, to which both branches are connected, is arranged to control communication between all other base stations, including base stations arranged in the same branch. Therefore, the first base station has more information about the other base stations, including look-up tables with routing information etc.

In this mechanism multicast messages, which comprise measurements in this case, are first sent to the core. The core base station as well as each router keeps track of the distribution lists (i.e. the list of target base stations intended to receive measurement reports). As mentioned above, in this context, a router is typically implemented as part of the base station. The application of the different reporting mechanism in core base tree routing would require the core to first sort all the measurements of the same kind from different base stations and destined to the same tree branch or route, in decreasing order of magnitude and multicast them as their relative difference.

As an example, consider a situation in which base station 11 wishes to transmit information about a measurement value to base station 24. Base station 12 wishes to transmit information about a measurement value to base station 25. Similarly, base stations 13 and 14 both wish to transmit to base station 21. Each of the transmitting base stations 11, 12, 13 and 14 transmits its information to the first, or core, base station 10. The measurement values do not have to be related to the same type of parameter, as long as they are reported on the same scale or using the same unit, such as dB or percent. The first base station 10 recognizes that the measurement values are intended for base stations in the same, second, branch and are reported on the same scale. In this case the first base station 10 may include all the measurement values in a multicast message for the second branch.

Figure 4:
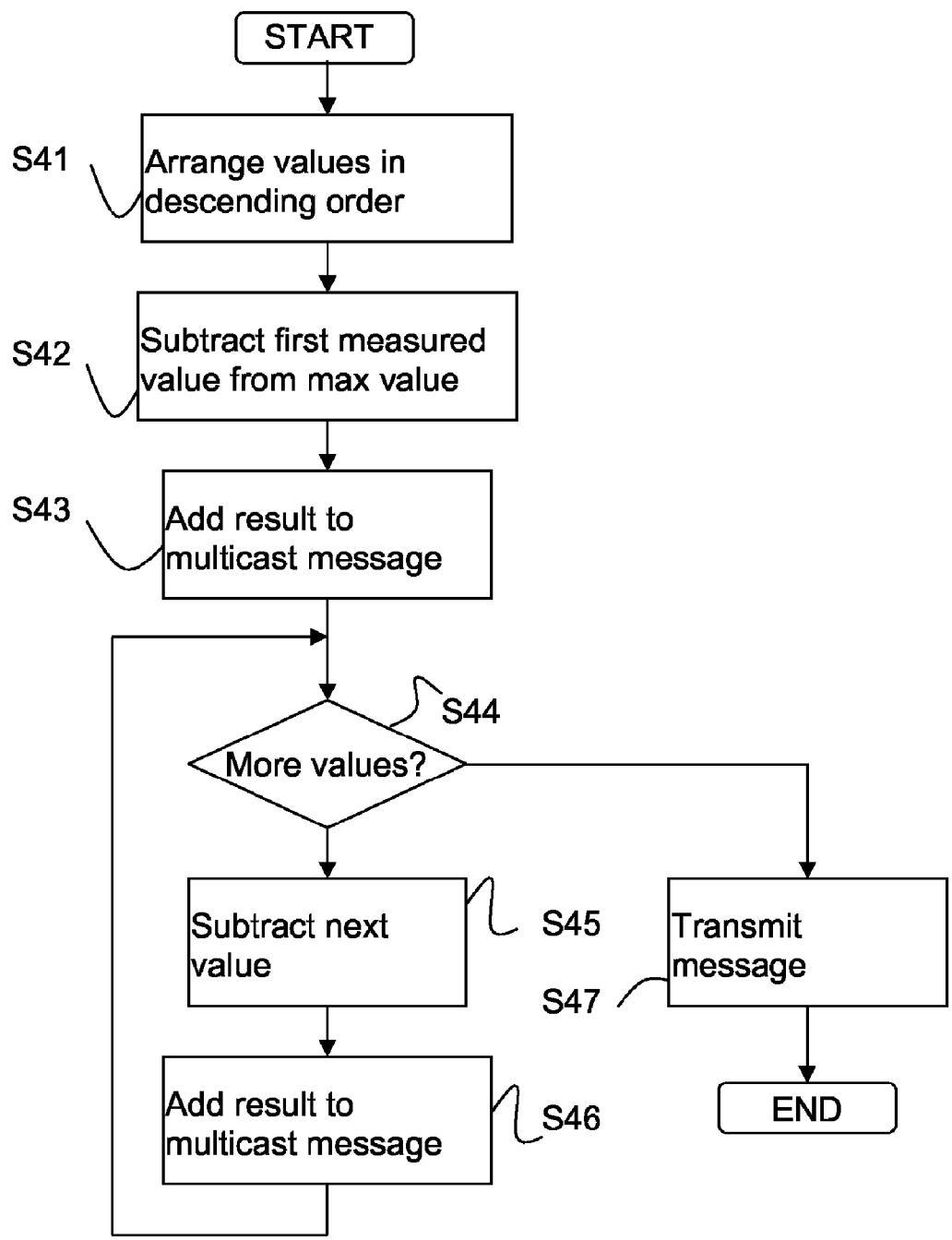
FIG. 4 is a flow chart of the procedure for creating and transmitting the multicast message according to the invention

The procedure for creating the multicast message according to the invention is shown in FIG. 4. This procedure is performed in the core base station 10 after receiving at least one measurement value from at least one source base station intended for transmission to at least one target base station.

In step S41 the measurement values received from the source base stations are arranged in descending order. This is an optional step, which will minimize the values to be included in the multicast message, thus minimizing the size of the multicast message.

In step S42 the first base station subtracts the greatest measurement value from the maximum value.

In step S43 the core base station includes the result of the subtraction performed in step S42 in the multicast message. To enable retrieval of the information in the target base station the following information must be included: the transmitting base station, the receiving base station, the measurement type and the result of the subtraction.

In step S44 it is determined whether more values should be included to the multicast message. If yes, go to step S45; if no, go to step S47.

In step S45, the first base station subtracts the next greatest measurement value from the preceding greatest measurement value.

In step S46 the first base station includes the result of the subtraction performed in step S45 in the multicast message. This includes information about the transmitting base station, the receiving base station, the measurement type and the result of the subtraction. The procedure then returns to step S44.

When it is determined in step S44 that there are no more measurement values, the multicast message is transmitted to the second branch, in step S47.

Figure 5:
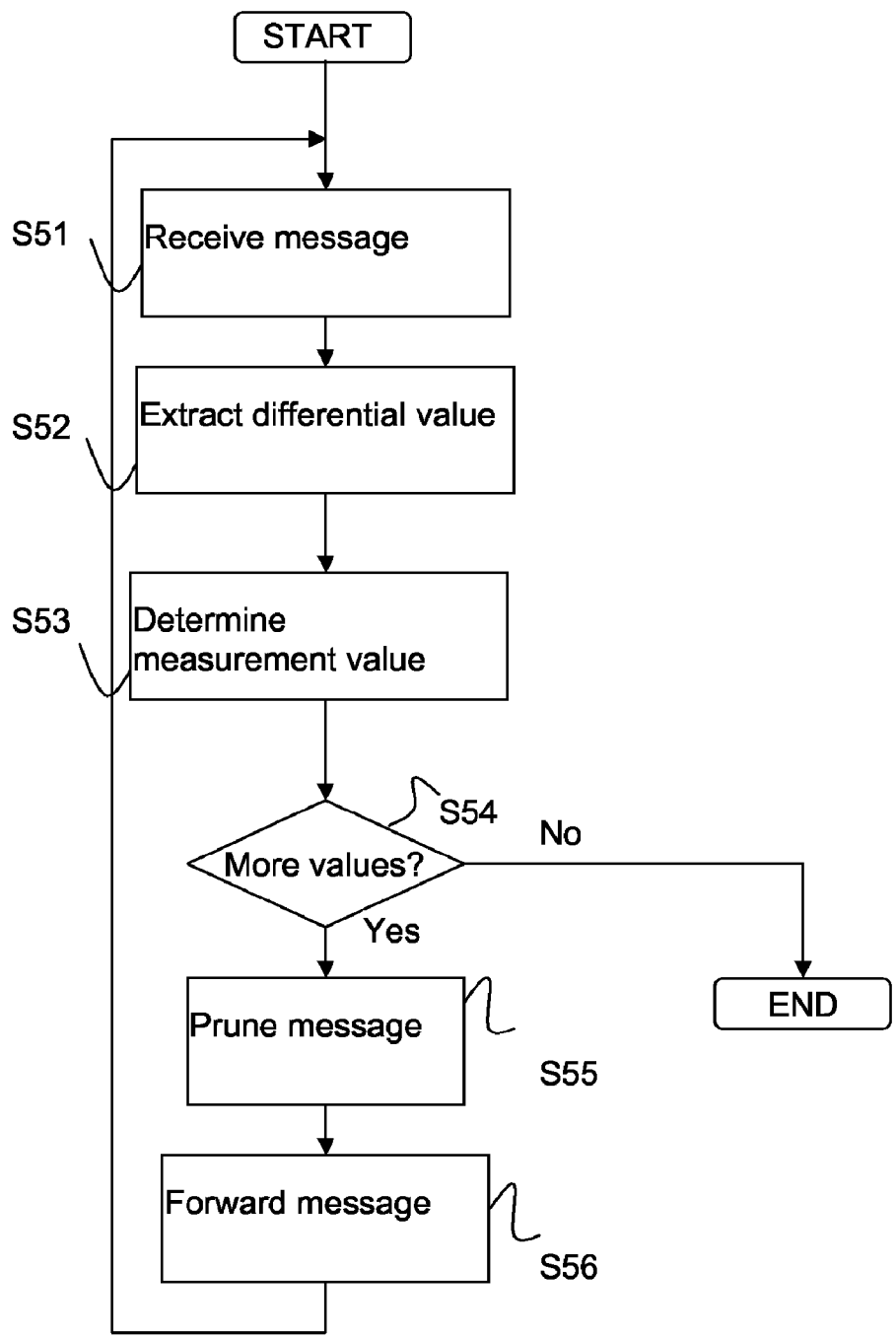
FIG. 5 is a flow chart of the procedure for receiving the multicast message according to the invention.

FIG. 5 is a flow chart of the procedure when a message is received in the second branch.

In step S51 the receiving base station receives the multicast message. The first time this is performed this will be the first base station 21 in the second branch.

In step S52 the receiving base station extracts the differential value and, if necessary, all preceding differential values.

In step S53, the receiving base station determines the measurement value on the basis of the subtractions performed in the procedure of FIG. 4.

In step S54 it is determined if the message should be forwarded to one or more other base stations in the second branch. This is the case if there are more values in the multicast message. If yes, go to step S54; if no, end of procedure.

In step S55 the message is pruned. This involves deleting the value extracted by the receiving base station and, of course, the corresponding identifiers. This may cause the need to recalculate subsequent differential values in the multicast message. Pruning is not necessary but will reduce further the signalling load in the network, at the expense of some increased processing requirements in each of the target base stations.

In step S56, the receiving base station forwards the pruned message to the next base station. For base station 21 this means forwarding the message to base station 22, which then becomes the receiving base station.

Of course, in step S52, if a there is no differential value intended for the receiving base station it will just pass the message on to the next base station in the tree, which then becomes the receiving base station. If no measurement value is intended for subsequent base stations in a branch, the message does not have to be forwarded to this branch. For example, if the message contains no value intended for base station 24 or 25, then base station 23 does not have to forward the message at all.

Assuming that the measurement value reported by base stations 12, 11, 13 and 14 are 70%, 85%, 50% and 90%, respectively, the multicast message will look as in FIG. 6. Assuming that all these values are above the threshold for reporting values, they will all be included in the multicast message, as shown in FIG. 6. If one or more of the values are below the threshold they will not be included, and the message will be shorter. The measurement values will be included in the following order, referring to the source base station: 14, 11, 12 and 13, as stated in a first field 61 of FIG. 6. Hence, the target base stations will be 21, 25, 24 and 21, in this order, as listed in a second field 62. A third field 63 states, for each value, the type of measurement it refers to. The measurement values to be reported will be 100−90=10, 90−85=5, 85−70=15 and 70−50=20, as reflected in a fourth field 64.

Table 1 shows a distribution list related to the example shown in FIG. 6 which has one column for each source base station 11, 12, 13, 14 and one row for each target base station 21, 22, 23, 24 and 25. The letter Y (for yes) or N (for no) indicates that a measurement value from the respective source base station should, or should not, respectively, be reported to the respective target base station.

TABLE 1

|    | 11 | 12 | 13 | 14 |
|----|----|----|----|----|
| 21 | N  | Y  | N  | Y  |
| 22 | N  | N  | N  | N  |
| 23 | N  | N  | N  | N  |
| 24 | N  | N  | Y  | N  |
| 25 | Y  | N  | N  | N  |

FIG. 7 shows a general multicast message according to the invention. In a first field 71 the source base stations are listed in the correct order, preferably in such a way that the first source base station, that is, the one reporting the highest value is listed first and the one reporting the lowest value is listed last. To make it more general, the source base stations are denoted $S_1$, $S_2$ etc. and the target base stations are denoted $T_1$, $T_2$, etc. in FIG. 7. In a second field 72 the target base stations are listed in the corresponding order, so that the target base station that is to receive the value from the first mentioned source base station is listed first, etc. The type of measurement value is listed in the corresponding order in a third field 73 and in a fourth field 74 the differential values are listed.

In the fourth field 74 the first differential value is the result of the subtraction of the first measurement value $M_1$ reported from the first source base station from the maximum value $M_{max}$ defined for the measurement value scale. The second differential value is the result of the subtraction of the second measurement value $M_2$ from the first measurement value $M_1$. The following differential values are calculated as $M_i-M_{i-1}$, i=3, 4 . . . As stated above the source base stations are preferably ordered in such a way that $M_1$ is the highest measurement value, $M_2$ is the second highest, etc.

A particularly advantageous situation occurs if one or more of the measurement values are equal. This is the case, for example if the same base station reports the same measurement value to all base stations of a branch. In this case one or more of the differential values will be zero, thus requiring a minimum of bandwidth. In case all these target base stations belong to a certain group identified by a common group identity, then only one measurement value, which is the difference between the maximum value ($M_{max}$) and the measurement quality needs to be reported, requiring even lower bandwidth (or number of bits).

Another special case will be if several source base stations are reporting measurement values to the same target base station.

The inventive idea can also be used for reporting several measurement values of different measurement types between one source entity and one target entity. Each of the source and target entity, respectively, in this case may be a mobile terminal or a base station. According to the invention the measurement values are reported in terms of differences. This is referred to as multifarious differential reporting.

For this method to be effective, the measurement values must be reported on the same scale. Examples of values that are suitable for differential reporting in this context are mean total transmitted carrier power, mean transmitted carrier power per channel (or per resource block), mean transmitted carrier power per antenna branch, received total power, total resource block usage etc.

For differential multifarious reporting, let M different measurement types, expressed on the same scale (e.g. percentage or on dB) with the same maximum and minimum values, $\Omega_{max}$ and $\Omega_{min}$, respectively, and sorted in decreasing order of magnitude as follows:
$[\lambda_1, \lambda_2, \ldots, \lambda_M]$ and whose corresponding ID are $[\theta_1, \theta_2, \ldots, \theta_M]$ The measurement reporting entity (user terminal or base station) reports differential measurements $\{\lambda\}$ and ID $\{\theta\}$ to the target entities (e.g. base stations) as follows:
$[\mu_1, \mu_2, \ldots, \mu_N]$, where: $\|1=\Omega_{max}-\lambda_1; \mu_2=\lambda_2-\lambda_1 \mu_N=\lambda_{N-\lambda_{N-1}}$ As before measurements, which are above a certain threshold ($\Omega_{min}$)) could be reported to further reduce the overheads.

Several measurements are reportable or are expected to be reported on the same scale, such as percentage. Examples of such base station measurements are: total transmitted carrier power, transmitted carrier power per branch, transmitted carrier power per resource block, downlink total resource block usage, uplink total resource block usage, downlink resource block activity, uplink resource block usage, link packet loss rate over X2 interface etc.

However, all measurements may not always be expressed on the same scale. In that case measurements that are reportable on same scale can be re-grouped and sent group wise in a differential way, e.g. percentage group, dB group, dBm group etc. It should be noted that this reporting mechanism is highly suited for base station measurement reports, i.e. exchange of measurements between base stations in transport network. But the idea is applicable and easily realizable also for reports from user terminals.

Figure 8:
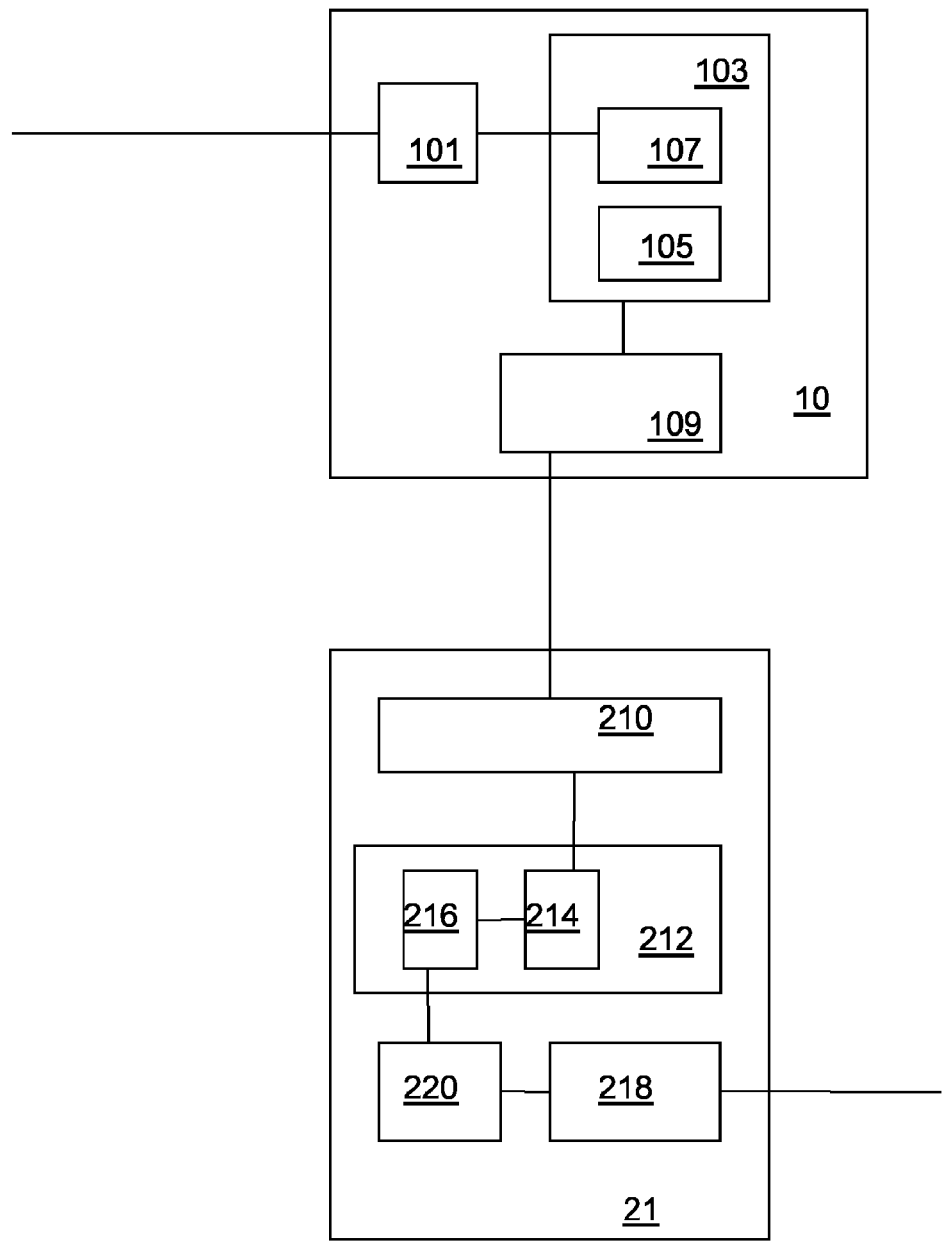
FIG. 8 illustrates in more detail a core base station and a target base station.

FIG. 8 illustrates in more detail the core base station 10 and one of the target base stations 21 of FIG. 3. The core base station 10 comprises receiving means 101 for receiving measurement values from the source base stations (not shown). From the receiving means the measurement values are forwarded to a generating means 103 comprising a calculating means 105 for calculating differential values based on the measurement values as described above. The generating means 103 preferably also comprises an ordering means 107 for ordering the measurement values in descending order before calculating the differential values. The generating means 103 generates a multicast message including the differential values and possibly other information as discussed in connection with FIGS. 6 and 7. The multicast message is forwarded through a transmitting means 109 to the target base station 21.

The target base station 21 comprises receiving means 210 for receiving the multicast message and retrieving means 212 for retrieving the measurement value intended for it. To this end the retrieving means 212 comprises extracting means 214 and calculating means 216. The extracting means 214 is arranged to extract a value information which is a differential value included in the multicast message by the core base station 10 and the calculating means 216 is arranged to calculate the actual measurement value based on the extracted differential value. The target base station 21 also comprises transmitting means 218 for forwarding the multicast message to one or more other base stations if it is determined by a determining means 219 that this should be done. Preferably the target base station 21 also comprises a pruning means 220 between the determining means and the forwarding means 118, for pruning the message before it is forwarded. Pruning involves removing from the multicast message any values that are not needed by any subsequent target base station, and is discussed in more detail above.

As will be understood, the units shown in FIG. 8 are not usually separate physical units but may be implemented as parts of a computer program, or as different program modules, running on the same or different processors in the respective base station. The division into units is arbitrary and intended as an example only, to illustrate the different functions performed by the base stations.

The invention claimed is:

1. A base station for use as a core base station in a tree structure having at least a first branch and a second branch of base stations, the base station comprising:
    means for receiving, from at least a first source base station, information about at least a first measurement value intended for at least a first target base station;
    means for generating a multicast message including information about the at least first measurement value, wherein the generating means comprises means for calculating a first differential value based on the at least first measurement value and at least a maximum value for the at least first measurement value; and
    means for transmitting the multicast message.

2. The base station of claim 1, wherein the calculating means is arranged to determine second value information related to a second measurement value as a second difference between the first differential value and the second measurement value and to include the second value information in the multicast message.

3. The base station of claim 2, further comprising ordering means for selecting a highest measurement value of a number of reported measurement values as the first measurement value and then handling the measurement values in descending order.

4. The base station of claim 2, wherein the generating means is arranged to include in the multicast message, for each measurement value, information about the source base station, the target base station, and a type of measurement.

5. A base station arranged to communicate through a core base station in a cellular network with at least one other base station, the base station comprising:
    means for receiving, from the core base station, a multicast message related to at least one measurement value from a source base station; and
    means for retrieving at least one measurement value intended for the base station, wherein the retrieving means comprises means for extracting a value information that is a differential value based on the measurement value and at least a maximum value for the measurement value, and means for calculating the measurement value based on at least the differential value and the maximum value.

6. The base station of claim 5, further comprising means for determining whether the multicast message includes value information relating to at least one other target base station, and means for forwarding the multicast message to at least one other target base station based on a determination by the determining means.

7. The base station of claim 6, further comprising means for pruning the multicast message before forwarding the multicast message to the at least one other target base station.

8. A signaling method for communicating measurement values from at least a first source base station to at least a first target base station connected through a core base station, comprising:
    reporting at least a first measurement value from the first source base station to the core base station;
    including, by the core base station, value information about the at least first measurement value in a multicast message, wherein the value information is determined as a first difference between a maximum value and the first measurement value; and
    transmitting the multicast message to the at least first target base station.

9. The method of claim 8, further comprising determining second value information related to a second measurement value as a second difference between the first difference and the second measurement value, and including the second value information in the multicast message.

10. The method of claim 9, further comprising selecting a highest measurement value as the first measurement value and then handling the measurement values in descending order.

11. The method of claim 9, further comprising including in the multicast message, for each measurement value, information about the source base station, the target base station, and a type of measurement.

12. The method of claim 8, wherein several measurement values, each belonging to a different measurement type, are communicated from one source base station to one target base station.

13. The method of claim 8, wherein several measurements related to several different source base stations are communicated to one or more target base stations.

14. The method of claim 8, wherein several measurements, each belonging to a different measurement type related to one source base station, are communicated to several target base stations.

15. A signaling method for retrieving measurement values from at least a first source base station in at least a first target base station, the source and target base stations being connected through a core base station, comprising:
    receiving, in a first target base station, a multicast message from the core base station; and
    determining, on the basis of the multicast message, at least a first measurement value intended for the first target base station, wherein determining the measurement value comprises extracting value information related to the measurement value from the multicast message, the value information including a first differential value based on the at least first measurement value and at least a maximum value for the at least first measurement value, and calculating the measurement value based on the value information and the at least maximum value for the measurement value.

16. The method of claim 15, further comprising determining whether the multicast message comprises value information intended for at least one other target base station, and if so, forwarding the multicast message to the at least one other target base station.

17. The method of claim 16, further comprising pruning the multicast message before forwarding the multicast message to the at least one other target base station.

* * * * *